US008464202B2

(12) United States Patent
Boshart et al.

(10) Patent No.: US 8,464,202 B2
(45) Date of Patent: Jun. 11, 2013

(54) FULLY PARAMETERIZABLE REPRESENTATION OF A HIGHER LEVEL DESIGN ENTITY

(75) Inventors: Shawn Boshart, Grantville, PA (US); Shahriar Moinian, New Providence, NJ (US); Joshua Williams, Perkasie, PA (US); Hong-Ha Vuong, Palo Alto, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/114,834

(22) Filed: May 24, 2011

(65) Prior Publication Data

US 2012/0304140 A1    Nov. 29, 2012

(51) Int. Cl.
*G06F 17/50*    (2006.01)
(52) U.S. Cl.
USPC .......................... 716/139; 716/110; 716/102
(58) Field of Classification Search
None
See application file for complete search history.

(56) References Cited

U.S. PATENT DOCUMENTS

| | | | | |
|---|---|---|---|---|
| 5,539,652 | A * | 7/1996 | Tegethoff | 703/14 |
| 5,692,160 | A * | 11/1997 | Sarin | 703/23 |
| 6,269,277 | B1 * | 7/2001 | Hershenson et al. | 700/97 |
| 6,813,597 | B1 * | 11/2004 | Demler | 703/14 |
| 7,293,247 | B1 | 11/2007 | Newton | |
| 8,024,682 | B2 * | 9/2011 | McConaghy et al. | 716/106 |
| 2004/0064296 | A1 * | 4/2004 | Saxena et al. | 703/2 |
| 2004/0177329 | A1 * | 9/2004 | Kasperkobitz | 716/3 |
| 2006/0015829 | A1 * | 1/2006 | De Smedt et al. | 716/2 |

OTHER PUBLICATIONS

Volker Meyer zu Bexten et al., "ALSYN: Flexible Rule-Based Layout Synthesis for Analogg IC's," IEEEJournal of Solid-State Circuits, vol. 28, No. 3, Mar. 1993, pp. 261-268.*
Graeme R. Boyle et al., "Macromodeling of Integrated Circuit Operational Amplifiers," IEEE Journal of Solid-State Circuits, vol. SC-9. No. 6, Dec. 1974, pp. 353-364.*
Youngsoo Kim et al., "INALSYS: A Layout Automation System based on Analog Layout Constraints," 1997 IEEE, pp. 1209-1212.*
Roland Jancke et al., "Supporting Analog Synthesis by Abstractin Cicuit Behavior Using a Modeling Methodology," 2006 IEEE, pp. 1471-1474.*
Young Soo Kim et al., "An Analog Layout Floorplanner Using Its Parameterized Module Layout Structure," 1996 IEEE, pp. 397-400.*
Uming Ko et al., "Mixed-Signal ASIC Simulation via an Analog Modeling Package," 1990 IEEE, 4 pages.*
Bob Melville et al.," A C++ Based Environment for Analog Circuit Simulation," 1992 IEEE, pp. 516-519.*
B. R. Owen et al., "Ballistic: An Analog Layout Language," IEEE 1995 Custom Integrated Circuits Conference, pp. 41-44.*
L. M. Reyneri et al., "A Hardware/Software Co-design Flow and IP Library Based of Simulink (trademenrk)," ACM DAC 2001, pp. 593-598.*
Michael Rumsey et al., "An ASIC Methodology for Mixed Analog-Digital Simulation," IEEE MICRO, Aug. 1990, pp. 34-40.*
Jian Wang et al., "Parameterized Macromodeling for Analog System-Level Design Exploration," ACM DAC 2007, pp. 940-943.*

* cited by examiner

*Primary Examiner* — Leigh Garbowski

(57) ABSTRACT

A parameterizable design system is for use with semiconductor analog circuits and includes an interface unit connected to provide access to the system, a database unit connected to supply a library of parameterizable analog building blocks for a design entity, and a parameterization unit connected to select a parameter for one of the library of parameterizable analog building blocks to meet a design specification of the design entity. Additionally, the parameterizable design system may also include a simulation unit connected to simulate an operation of the design entity employing the parameter, and an analyzer unit connected to analyze a sensitivity of the parameter for the design entity based on the design specification. A method of designing a semiconductor analog circuit is also included.

18 Claims, 3 Drawing Sheets

FULLY PARAMETERIZABLE REPRESENTATION OF A HIGHER LEVEL DESIGN ENTITY

TECHNICAL FIELD

This application is directed, in general, to semiconductor circuits and, more specifically, to a parameterizable design system and a method of designing a semiconductor analog circuit.

BACKGROUND

Generally, integrated circuits can employ millions of individual circuits to perform digital or analog functions. In turn, each of these individual circuits can employ hundreds, if not thousands, of individual electronic components. The creation and placement of these individual electronic components, such as transistors, resistors and capacitors along with their metal interconnects provide a significant design challenge. Computer aided design environments for digital functions have taken advantage of logic functions lending themselves to cell-based design approaches where the logic functions may be constructed of standardized cells. This level of design for analog functions has been impeded, since analog design involves specific tailoring of their components to meet design requirements thereby preventing the use of standardized cells. Improvements in this area would prove beneficial to the art.

SUMMARY

Embodiments of the present disclosure provide a parameterizable design system and a method of designing a semiconductor analog circuit. In one embodiment, the parameterizable design system is for use with semiconductor analog circuits and includes an interface unit connected to provide access to the system, a database unit connected to supply a library of parameterizable analog building blocks for a design entity, and a parameterization unit connected to select a parameter for one of the library of parameterizable analog building blocks to meet a design specification of the design entity. Additionally, the parameterizable design system may also include a simulation unit connected to simulate an operation of the design entity employing the parameter, and an analyzer unit connected to analyze a sensitivity of the parameter for the design entity based on the design specification.

In another aspect, the method of designing a semiconductor analog circuit includes providing a design specification, supplying a library of parameterizable analog building blocks for a design entity and selecting a parameter for one of the library of parameterizable analog building blocks for the design entity to meet the design specification. The method may also include simulating an operation of the design entity employing the parameter and analyzing a sensitivity of the parameter for the design entity based on the design specification.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure allow designing an analog circuit by piecing together parameterized higher level blocks instead of designing at a lower primitive level (i.e., a circuit component level). Furthermore, implementation is such that representations of a given higher level block, which may include device symbols, circuit diagrams, and mask layout drawings, are fully parameterized. This simplifies designing in advanced silicon technologies by freeing a designer from having to know a great deal about underlying technology restrictions, since parameterization is provided automatically through use of a parameterizable cell-based analog design methodology employing these fully parameterized representations. Embodiments of the disclosure may accommodate a wide range of variation across all aspects of the design process through this parameterization.

Figure 1:
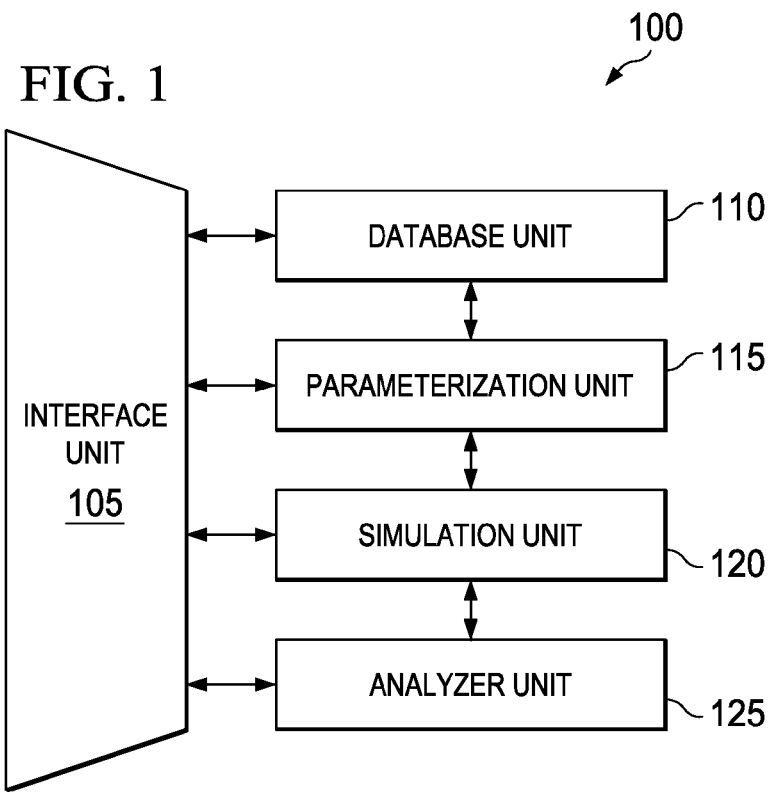
FIG. 1 illustrates a block diagram of an embodiment of a parameterizable design system constructed according to the principles of the present disclosure.

FIG. 1 illustrates a block diagram of an embodiment of a parameterizable design system, generally designated 100, constructed according to the principles of the present disclosure. The parameterizable design system 100 is for use in designing semiconductor analog circuits and includes an interface unit 105, a database unit 110, a parameterization unit 115, a simulation unit 120 and an analyzer unit 125.

In the illustrated embodiment, the interface unit 105 provides access for an analog designer to the parameterizable design system 100, and the database unit 110 supplies a library of parameterizable analog building blocks for a design entity. The parameterization unit 115 selects a parameter for one of the library of parameterizable analog building blocks to meet a design specification of the design entity. The simulation unit 120 allows simulation of an operation of the design entity employing the parameter, and the analyzer unit 125 analyzes a sensitivity of the parameter for the design entity based on the design specification.

The parameterizable design system 100 enables cell-based analog circuit design by employing a set of parameterized analog building blocks (i.e., analog cells) to realize a functional block of a circuit. Therefore, design at a transistor level is largely eliminated. Furthermore, the implementation is such that all representations of a given analog building block are fully parameterized, including device symbols, circuit diagrams and mask layout drawings, for example. Users of the parameterizable design system 100 do not need to work at the transistor design level since this level of design will be automatically provide by the parameterizable design system 100 through the parameterization process.

These analog design building blocks may be prevalent across an entire analog design, but will typically provide different performance characteristics across the analog design because they are required to meet varying engineering needs or situations. The parameterizable design system 100 allows for these analog building block cells to provide a very large amount of variation across all aspects of the design process through parameterization.

There are different levels of analog cells. At a first level, a parameterizable cell is called the parameterizable analog building block. A second level is a functional block, where the functional block is a collection of these building blocks. A system may then be made up of a collection of functional blocks.

The parameterizable design system 100 allows an analog designer to place a building block (e.g., a current mirror) in a design and use its associated parameters to specify and therefore control the configuration of the building block (current mirror) to meet a design specification. The parameters controlling a building block will vary based on the specific building block. For the current mirror, the analog designer can specify attributes of the current mirror to control a MOSFET type, a MOSFET size, and the ratio at which to mirror its current.

By designing at a higher level and specifying attributes (e.g., parameters such as a desired output current ratio) instead of designing at a primitive level and placing individual MOSFET pieces, a large reduction in time and effort for the entire design may be realized. Additionally, the parameterizable design system 100 allows the analog design to automatically adhere to the best practices for design and layout guidelines based on the knowledge embedded in the methodology, while being transparent to the analog designer.

For the current mirror example, pertinent representations of the current mirror are automatically generated by the parameterizable design system 100. These representations include a symbol which is placed in a schematic, a current mirror circuit netlist which is generated from the schematic and a physical representation that is created in a mask layout. Automatic creation of a physical representation is one of the greatest benefits offered by the parameterizable design system 100 since most time and effort is ordinarily consumed in this aspect of analog circuit design. These building blocks allow a designer to automatically create layouts that are valid, which is increasingly difficult due to very restrictive layout guidelines for advanced silicon technologies. Examples of a current mirror symbol, schematic and mask layout are provided in FIGS. 2, 3 and 4 below.

Figure 2:
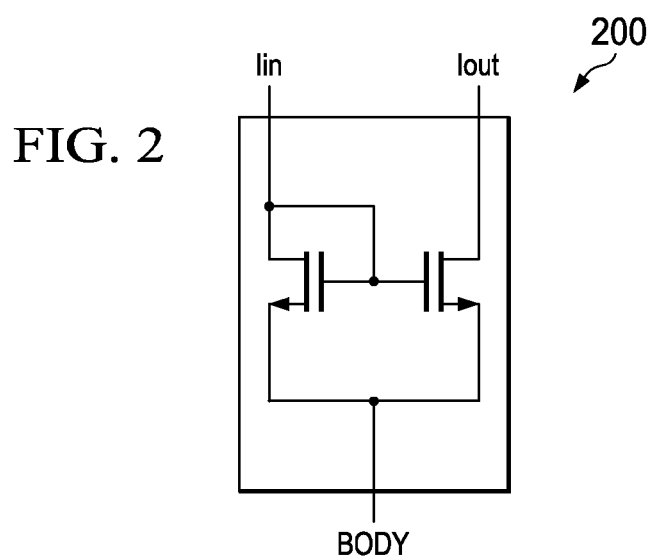
FIG. 2 illustrates a representation of a current mirror building block symbol constructed according to the principles of the present disclosure.

FIG. 2 illustrates a representation of a current mirror building block symbol, generally designated 200, constructed according to the principles of the present disclosure. The current mirror 200 building block symbol is shown that will be instantiated within circuit schematics inside of the parameterizable design system 100. The symbol is parameterizable by allowing the designer to specify the device level size, type, and ratio of current mirror. The symbol representation visibly changes based on the input parameters therefore allowing a designer to understand the building block properties by simply looking at the device in a schematic.

Figure 3:
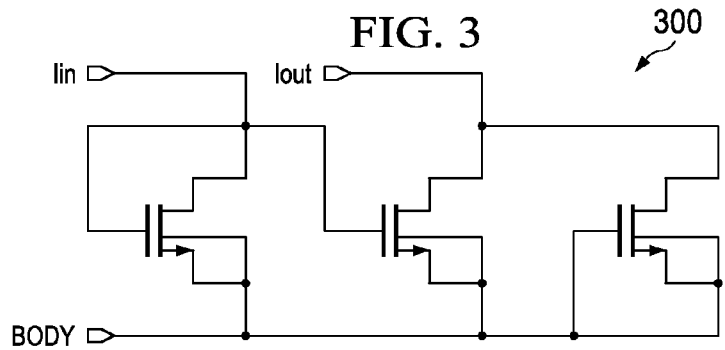
FIG. 3 illustrates a representation of a current mirror schematic as may be employed with the current mirror building block shown in FIG. 2.

FIG. 3 illustrates a representation of a current mirror schematic, generally designated 300, as may be employed with the current mirror building block 200 shown in FIG. 2. The current mirror schematic 300 is generated automatically based on the same parameter set that is entered on the current mirror building block 200, shown in FIG. 2. Then the current mirror schematic 300 is used to generate a netlist for the current mirror building block 200, simulate this building block, and drive downstream mask layout generation tools. So, the analog designer does not actually design at the device level, but merely edits properties at the building block level.

Figure 4:
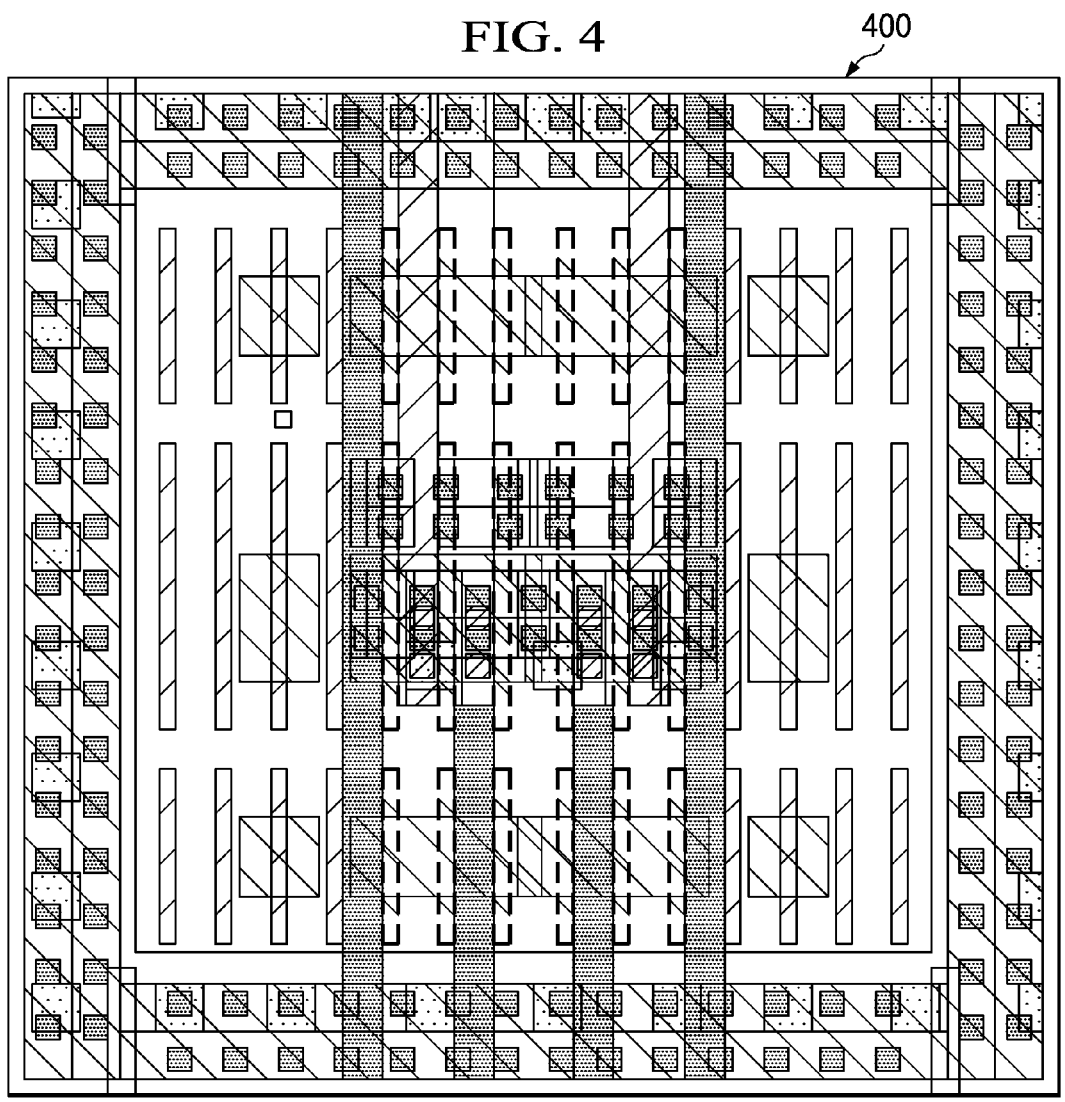
FIG. 4 illustrates a representation of a physical mask layout as may be employed with the current mirror building block shown in FIG. 2.

FIG. 4 illustrates a representation of a physical mask layout, generally designated 400, as may be employed with the current mirror building block shown in FIG. 2. The physical mask layout 400 representation usually takes much more time and resources to create and verify within an analog design due to very restrictive layout constraints. These layout constraints become increasingly difficult to satisfy for advanced silicon technologies. A large time and resource savings is realized by utilizing the parameterizable design system 100 to design in such a manner that the analog designer need not be concerned with the device level parameters and related layout guidelines.

Referring again to FIG. 1 and considering an operational amplifier (OPAMP) design example, where the OPAMP is a functional block that is a collection of building blocks. The OPAMP is composed of several building blocks including a differential pair, a current mirror, a current source and a source follower, which are each parameterizable. For the differential pair (a gain stage building block or cell), parameters of gain and voltage offset need to be determined and adjusted to meet a design specification. The parameterizable design system 100 determines transistor sizes and transistor match requirements to provide the gain and voltage offset selected.

Then, the differential pair needs to be biased by using another instantiation of a current mirror that mirrors a current that is generated somewhere else into this differential pair to provide biasing of this differential pair. The bottom of this differential pair is connected to a current source. A current source is another instantiation of these blocks, where the current source mirrors a current up to the current mirrors. This completes the first gain stage of the OPAMP.

If a second gain stage is employed, it would have similar required parameters, which may be constructed employing different parameter values. Finally, an output stage, (e.g., a source follower), is another instantiation block wherein parameters are chosen depending on the type of load being driven. These parameterized building blocks allow the analog designer to just arrange the blocks in a circuit schematic and adjust the various parameters to meet desired requirements for the circuit. A collection of OPAMPS may be further included in an analog system. Additionally, the analog system may include a voltage or current reference generator (e.g., a band gap generator), a phase locked loop (PLL) functional block including a voltage controlled oscillator (VCO) or a phase detector to construct a receiver or a transmitter, for example.

As a general design approach using the parameterizable design system 100, an analog designer starts with a design specification for the design entity required. Then a functional block schematic is created that is populated with parameterizable analog building blocks representing electronic symbols required by the functional block schematic. Once parameters are selected for the parameterizable analog building blocks (electronic symbols) a netlist is generated for the functional block.

The functional block schematic is then simulated and analyzed to determine its performance for its selected parameters as compared to the design specification. If the performance is not acceptable, the selected parameters are adjusted and analyzed until an adjusted functional block performs to meet the design specification.

At this point, a mask layout is generated for the adjusted functional block that conforms to required technology restrictions, and this representation is again simulated and analyzed based on the design specification. If the mask layout performance is not acceptable, the mask layout or the selected parameters are further adjusted to bring the revised functional block into performance compliance with the design specification.

There are different ways of adjusting the parameters of the different instantiations of these blocks. For the example of the OPAMP, the simulation unit 120 may be employed to simulate an operation of the OPAMP based on using its schematic representation. Then a sensitivity analysis may be employed to certain parameters (e.g., to adjust gain and bandwidth) using the analyzer unit 125. This allows fine tuning the parameters of the cells to accommodate other factors (e.g., parameter and layout variations), as well. So, basically, the parameters may serve as "adjustment knobs" for the design cells.

Figure 5:
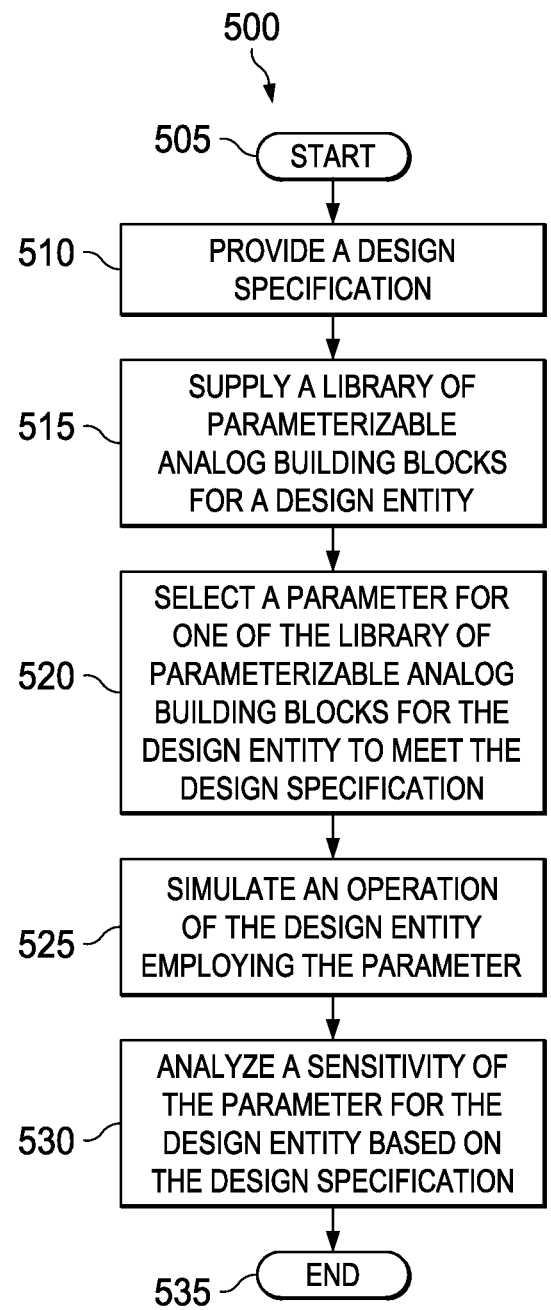
FIG. 5 illustrates a flow diagram of an embodiment of a method of designing a semiconductor analog circuit carried out according to the principles of the present disclosure.

FIG. 5 illustrates a flow diagram of an embodiment of a method of designing a semiconductor analog circuit, generally designated 500, carried out according to the principles of the present disclosure. The method 500 starts in a step 505 and then, a design specification is provided in a step 510. A library of parameterizable analog building blocks for a design entity is supplied in a step 515, and a parameter for one of the library of parameterizable analog building blocks for the design entity is selected to meet the design specification, in a step 520. An operation of the design entity employing the parameter is simulated in a step 525, and a sensitivity of the parameter for the design entity is analyzed based on the design specification, in a step 530.

Generally, each representation of the design entity is parameterizable wherein each representation of the design entity may be selected from the group consisting of an electronic symbol, an electronic schematic, a wiring netlist and an electronic layout such as a physical mask layout. Additionally, the parameterizable analog building blocks at a lowest design level are electronic symbols.

Selecting the parameter corresponds to selecting from a parameter set tailored for each of the library of parameterizable analog building blocks. In one embodiment, selecting the parameter corresponds to selecting from a continuously variable range of parameter values to meet the design specification. In another embodiment, selecting the parameter corresponds to selecting from a discretely variable range of parameter values to meet the design specification. The method 500 ends in a step 535.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A parameterizable design system for use with semiconductor analog circuits, comprising:
   an interface unit connected to provide access to the system;
   a database unit connected to supply a library of analog building blocks for a design entity, wherein each representation of the building blocks is parameterizable by device level size or type; and
   a parameterization unit connected to select a parameter for one of the analog building blocks of the library, wherein the parameter selected satisfies a higher level design specification of the design entity.

2. The system as recited in claim 1 further comprising a simulation unit connected to simulate an operation of the design entity employing the parameter.

3. The system as recited in claim 2 further comprising an analyzer unit connected to analyze a sensitivity of the parameter for the design entity based on the design specification.

4. The system as recited in claim 1 wherein the parameter corresponds to a parameter set tailored for each of the library of parameterizable analog building blocks.

5. The system as recited in claim 1 wherein the parameter is selectable from a continuously variable range of parameter values to meet the design specification.

6. The system as recited in claim 1 wherein the parameter is selectable from a discretely variable range of parameter values to meet the design specification.

7. The system as recited in claim 1 wherein the library of parameterizable analog building blocks for a lowest design level corresponds to electronic symbols.

8. The system as recited in claim 1 wherein each representation of the design entity is parameterizable.

9. The system as recited in claim 1 wherein a representation of the design entity is selected from the group consisting of:
   an electronic symbol;
   an electronic schematic;
   a wiring netlist; and
   an electronic layout.

10. A method of designing a semiconductor analog circuit, comprising:
    providing a design specification;
    supplying a library of analog building blocks for a design entity, wherein each representation of the building blocks is parameterizable by device level size or type; and
    selecting, using a computer, a parameter for one of the analog building blocks of the library, wherein the parameter selected enables the design entity to meet the higher level design specification.

11. The method as recited in claim 10 further comprising simulating an operation of the design entity employing the parameter.

12. The method as recited in claim 11 further comprising analyzing a sensitivity of the parameter for the design entity based on the design specification.

13. The method as recited in claim 10 wherein selecting the parameter corresponds to selecting from a parameter set tailored for each of the library of parameterizable analog building blocks.

14. The method as recited in claim 10 wherein selecting the parameter corresponds to selecting from a continuously variable range of parameter values to meet the design specification.

15. The method as recited in claim 10 wherein selecting the parameter corresponds to selecting from a discretely variable range of parameter values to meet the design specification.

16. The method as recited in claim 10 wherein the library of parameterizable analog building blocks for a lowest design level corresponds to electronic symbols.

17. The method as recited in claim 10 wherein each representation of the design entity is parameterizable.

18. The method as recited in claim 10 wherein a representation of the design entity is selected from the group consisting of:
    an electronic symbol;
    an electronic schematic;
    a wiring netlist; and
    an electronic layout.

* * * * *